H. J. HELMERS.
TRACTOR ATTACHMENT.
APPLICATION FILED FEB. 10, 1920.
1,354,252.
Patented Sept. 28, 1920.
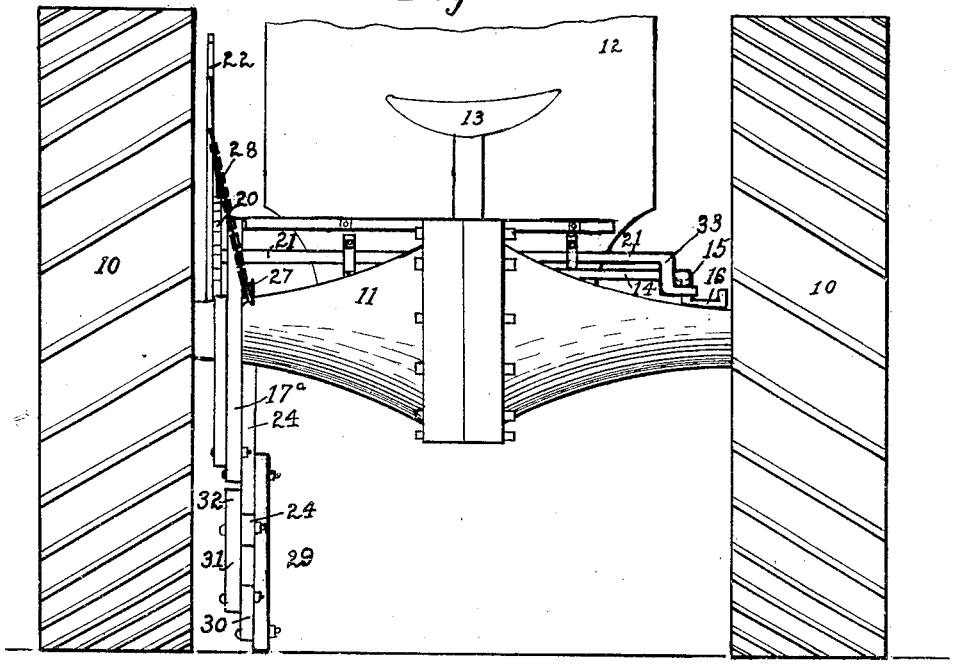
Fig. 1.
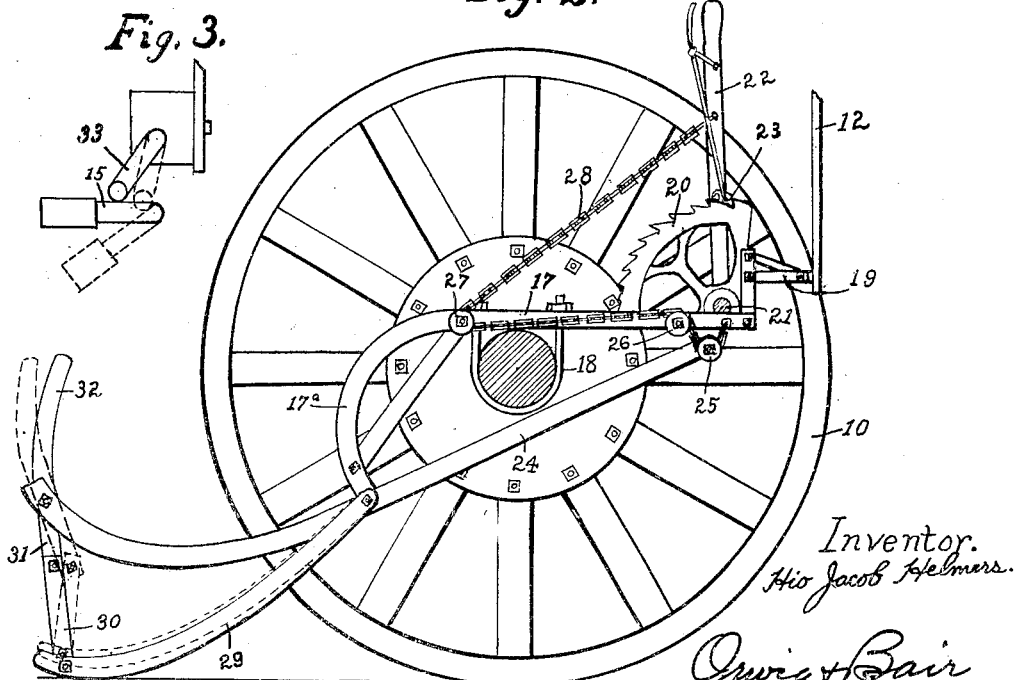
Fig. 3.
Fig. 2.
Inventor.
Hio Jacob Helmers.
Witness.
Roy Kisor.
By. Orwig & Bair
Attorneys.

UNITED STATES PATENT OFFICE.

HIO JACOB HELMERS, OF SIBLEY, IOWA.

TRACTOR ATTACHMENT.

1,354,252.   Specification of Letters Patent.   Patented Sept. 28, 1920.

Application filed February 10, 1920. Serial No. 357,671.

*To all whom it may concern:*

Be it known that I, HIO JACOB HELMERS, a citizen of the United States, and a resident of Sibley, in the county of Osceola and State of Iowa, have invented a certain new and useful Tractor Attachment, of which the following is a specification.

The object of my invention is to provide an attachment for tractors so constructed and arranged as to coact with the clutch control mechanism of the tractor for throwing such mechanism to inoperative position, and thereby holding the power plant out of gear whenever the front end of the tractor tilts upwardly.

With this and other objects in view my invention consists in the construction, arrangement and combination of the various parts of the device, whereby the objects contemplated are attained as hereinafter more fully set forth, pointed out in my claims and illustrated in the accompanying drawings in which:

Figure 1 shows a rear elevation of a portion of a tractor equipped with an attachment embodying my invention.

Fig. 2 shows a sectional view taken through the axle close to one of the tractor wheels; and Fig. 3 shows a detail view of part of the mechanism of the device.

With certain types of tractors now in use it sometimes happens, under rather unusual circumstances, that the front end of the tractor tilts upwardly, and the tractor upsets by turning over backward.

Such an accident could not happen if the tractor were thrown out of gear immediately after the front end begins its upwardly tilting movement. It is, therefore, my purpose to provide a device in the form of a simple and inexpensive attachment adapted to coact with the tractor parts and with the surface of the ground over which the tractor is traveling, so that when the front end of the tractor commences its upwardly tilting movement, my attachment will be actuated for throwing the clutch control rod to position for holding the clutch out of gear.

In the accompanying drawings, I have used the reference numeral 10 to indicate generally the large traction wheels of a tractor. Extending between the wheels 10 is the axle and differential housing 11. I have also indicated generally the main frame 12 and the seat 13.

Suitably mounted is a clutch control rod 14 having near one end the right-angled extension 15 terminating in a foot pedal 16, which is located at a point convenient of access to the driver on the machine.

My improved attachment includes a longitudinally extending supporting bar 17 preferably resting on the axle housing 11, and for instance at the left-hand side of the machine the bar 17 is connected with the axle housing 11 by means of a U-bolt 18.

At its forward end the bar 17 is supported on the main frame of the machine by suitable frame members 19. Rigidly supported on the bar 17 near its forward end is a toothed sector 20. Extending transversely across the machine is a shaft 21, on one end of which adjacent to the sector 20, is a controlling lever.

On the lever 22 is a pawl 23 adapted to coact with the teeth of the sector 20.

At the rearward end of the bar 17 is a downward extension 17ª. Pivoted between its ends to the lower end of the extension 17ª is one member 24 of an actuating device. One end of the member 24 extends forwardly to position near the forward end of the bar 17. On the forward end of the member 24 is a pulley 25. On the bar 17 rearwardly with relation to the forward end of the member 24 are guide pulleys 26 and 27. Secured to the lever 22 is a chain or other flexible device 28 which is extended rearwardly around the guide pulley 27 thence over the guide pulley 26, thence downwardly around the guide pulley 25 on the member 24, and thence upwardly to the upper end of the bar 17, to which one end of said flexible device is connected.

Pivoted to the member 24 is a second portion of the actuating device including the member 29, which extends downwardly and rearwardly from the member 24 at a point near the pivot point thereof to position below the rearward end of the member 24 as illustrated in Fig. 2.

Pivoted to the rear end of the member 29 is the lower end of one member 30 of a jointed lever. The upper end of the lever member 30 is pivoted to the lower end of the other member 31 of said jointed lever. The member 31 has an upwardly extending handle 32. Ordinarily the members 30 and 31 of said jointed lever are arranged to be in substantial alinement with each other so as to hold the rear ends of the members 29 and 24 separated from each other.

By grasping the handle 32 an operator may, if he desires, move the jointed lever consisting of the members 30 and 31 toward collapsed position, as illustrated by dotted lines in Fig. 2, for the purpose of raising the rear end of the member 29 for clearing stones or other obstructions which might be in the path of the tractor.

The shaft 21, hereinbefore mentioned, is mounted in suitable bearings and extends across the machine, and has on its ends opposite the sector 20 a crank 33, one arm of which is arranged in such position that when the rear end of the member 24 is raised, and the forward end of the member 24 is lowered, for pulling on the chain or flexible device 28 for thereby drawing the lever 22 rearwardly and imparting rotation to said shaft 21. The arms of the crank 33 will engage the extension 15 of the clutch control rod 14 for actuating the clutch control rod for thereby throwing the clutch out of gear.

In Fig. 3 the crank 33 and the clutch control rod portion 15 are shown in full lines in position where the shaft 21 is inoperative, and in dotted lines in position where said shaft has been operated for throwing the clutch out of gear.

In the practical use of my improved attachment, it will be understood that while the tractor is being used in the ordinary way, the lever 22 will be at the forward end of its movement.

The lever will hold the chain 28 taut for holding the forward end of the member 24 in its raised position. This will hold the rearward end of the lever 29 in its lower position. It will be understood that the lever members 30 and 31 are then in alinement.

The crank 33 will stand in such position as to permit the ordinary operation of the clutch pedal without interference therewith. If in the course of the use of the tractor, the driver should notice a stone or other obstruction in the path of the actuating member 29, he can utilize the handle 32 for raising the member 29 for permitting it to clear such obstruction without interfering with the ordinary operation of the tractor.

If, owing to any unusual circumstances, or for any reason whatsoever the tractor should commence to tilt upwardly at its forward end, it will be seen that the actuating member 29 will contact with the ground in such a way that through the medium of the lever members 30 and 31 the rear end of the member 24 will be forced upwardly, thereby bringing the forward end of said member 24 downwardly, and pulling on the chain 28 for drawing the lever 22 rearwardly.

The movement of the lever 22 will impart limited rotation to the shaft 31, for causing the cranks 33 to engage the clutch control rod extension 15 for moving it and thereby rotating the clutch control rod a sufficient distance to throw the clutch out of gear. It will be readily understood that as soon as the clutch is thrown out of gear, no power will be applied to the traction wheels and the engine will immediately stop and its front end will settle down on the ground.

The pawl 23 will coact with the teeth of the sector 20 for holding the lever 22 in its rearward position until the operator releases said pawl. This will give the operator plenty of time to correct any unusual conditions that may have led to the upward tilting of the forward end of the tractor.

In the use of tractors of the type under consideration, it has been found that when the tractors have tilted over and backwardly, the action has been so quick that the operator has usually been unable to do anything. With my device, the tractor is automatically thrown out of gear and the operator is thereby protected.

It will readily be seen that changes might be made in the details of the construction and arrangement of the parts of my improved device, without departing from the real spirit and purpose of my invention, and it is my intention to cover by my claims any modified forms of structure or use of mechanical equivalents which may reasonably be included within their scope.

I claim as my invention:

1. The combination of a tractor having a clutch control device, with an attachment comprising a member adapted to coact with the ground, and to be moved thereby when the front end of the tractor is tilted upwardly, a second member adapted when moved to one position to move the clutch control device, for rendering the clutch inoperative, and mechanism for operatively connecting said members for causing the second member to be actuated when the front end of the tractor is tilted upwardly, said mechanism including a flexible device operatively connected with said first member, a lever for holding said flexible device taut fixed on said member, and a pawl and ratchet device arranged for holding said lever in any position to which it may be moved by the operation of said member.

2. The combination of a tractor having a clutch control device, with an attachment comprising a member adapted to coact with the ground, and to be moved thereby when the front end of the tractor is tilted upwardly, a second member adapted when moved to one position to move the clutch control device, for rendering the clutch inoperative, and mechanism for operatively connecting said members for causing the second member to be actuated when the front end of the tractor is tilted upwardly, said first member having parts capable of manual operation for permitting said first member to clear an obstruction in the path of the tractor, without actuating said second member.

3. In a device of the class described, the combination of a tractor having a clutch control device, with a supporting member, a toothed sector supported thereon, an actuating member pivoted on said supporting member, having one end adapted to travel near the ground during the movement of the tractor in ordinary progress, a rotatably mounted shaft having a member thereon, adapted to coact with said clutch control device for actuating said device when said shaft is rotated to a certain position of its movement, a lever on said shaft, having a pawl pivoted thereto adapted to coact with said toothed sector, a flexible device connected with said lever and with said support, guide members for the flexible device on said support, and on said actuating member, the parts being so arranged that when the rear end of said actuating member contacts with the ground upon the upward tilting of the tractor, said lever will be actuated through said flexible device for imparting rotation to said shaft for causing it to operate the clutch control device.

4. In a device of the class described, the combination of a tractor having a clutch control device, with a supporting member, a toothed sector supported thereon, an actuating member pivoted on said supporting member, having one end adapted to travel near the ground during the movement of the tractor in ordinary progress, a rotatably mounted shaft having a member thereon adapted to coact with said clutch control device for actuating said device, when said shaft is rotated to a certain position of its movement, a lever on said shaft having a pawl pivoted thereto and adapted to coact with said toothed sector, a flexible device connected with said lever and with said support, guide members for the flexible device on said support and on said actuating member, the parts being so arranged that when the rear end of said actuating member contacts with the ground upon the upward tilting of the tractor, said lever will be actuated through said flexible device for imparting rotation to said shaft for causing it to operate the clutch control device, said actuating member having a plurality of parts capable of manual adjustment for raising the rear end of said actuating member for permitting it to clear ordinary obstructions in the path of the tractor.

HIO JACOB HELMERS.